United States Patent [19]

Martin

[11] 3,715,502

[45] Feb. 6, 1973

[54] ALARM COUPLER

[75] Inventor: Stephen J. Martin, Miami, Fla.

[73] Assignee: Robertshaw Controls Company, Richmond, Va.

[22] Filed: March 3, 1971

[21] Appl. No.: 120,416

[52] U.S. Cl. ................................................179/2 C

[51] Int. Cl. ..........................................H04m 11/04

[58] Field of Search.................179/5 P, 5 R, 1 C, 2 C

[56] References Cited

UNITED STATES PATENTS

| | | | |
|---|---|---|---|
| 3,582,555 | 6/1971 | Kok | 179/5 R |
| 3,105,121 | 9/1963 | Field | 179/5 R |
| 3,407,269 | 10/1968 | Brzoska | 179/5 R |
| 3,404,236 | 10/1968 | Halrey | 179/5 R |
| 3,369,079 | 2/1968 | Glidden | 179/5 R |

*Primary Examiner*—Kathleen H. Claffy
*Assistant Examiner*—David L. Stewart
*Attorney*—Brenner, O'Brien & Guay

[57] ABSTRACT

A solid-state coupler for transferring a telephone line from conventional house phones to automatic dialing apparatus upon the occurrence of an alarm includes a main transfer relay, a dialing relay adapted to be controlled by the automatic dialing apparatus, a start hang-up timer for opening the telephone line for a preselected hang-up interval upon actuation of the main transfer relay, a dial pulse reconstitution network, and a release delay timer for holding the main transfer relay energized for a preselected release time upon termination of the alarm sequence. Solid-state timing networks of the coupler provide line clearance and total exclusion of house phones for priority handling of all emergency calls.

16 Claims, 2 Drawing Figures

INVENTOR,
Stephen J. Martin
BY Brenner, O'Brien, Guay & Connors
ATTORNEYS

INVENTOR,
Stephen J. Martin
BY
Brenner, O'Brien, Guay & Connors
ATTORNEYS

ALARM COUPLER

BACKGROUND OF THE INVENTION

1. Field of the Invention

The present invention pertains to telephone couplers and more particularly to an alarm coupler for transferring a telephone line from house phones to automatic dialing apparatus upon the occurrence of an alarm condition.

2. Description of the Prior Art

Various security systems have been developed in the past to automatically alert a centrally located operator of the existence of an alarm condition sensed at any one of a number of remote points. Such systems often employ public telephone facilities for interconnecting the various remote points to the central operator location, especially where the remote points are separated from the central location by a considerable distance. Systems of this type typically include individual subscriber units each located at a separate field point and utilizing automatic dialing apparatus for generating a series of dialing pulses corresponding to the telephone number of the monitoring station upon the detection of an emergency.

The increasing popularity of systems of the above type has created the need for a simple and inexpensive coupler for providing alternate connection of a subscriber's telephone line with conventional house phones when no emergency is in progress and with the automatic dialing apparatus when an alarm develops. In order to provide a practical alarm coupler, provision must be made to assure telephone line clearance upon the occurrence of an alarm, total exclusion of the house phones in an emergency, delayed reversion to the house phones for permitting redialing of the central station by the alarm apparatus in the event of misdialing or an incompleted call, and reconstitution of the dialing pulse output of the automatic dialing apparatus to meet public telephone system standards.

While the prior art, as exemplified by U.S. Pat. Nos. 2,555,714, 3,404,236, and 3,527,892, is generally cognizant of the problem of coupling house phones and automatic alarm systems with a subscriber's telephone line, the prior art couplers have proven to be deficient in reconstituting dialing pulses, excluding the house phones during an emergency, failing to minimize current drain during quiescent periods, providing line clearance for priority handling of alarm calls, and enabling rapid redialing by the alarm apparatus. In addition, such devices are mechanically complex and bulky in size, presenting problems in both concealment and reliability. As a result, prior art alarm systems are often ineffective, exhibit high false-alarm rates, and undesirably interfere with the operation of the public telephone systems with which they are used.

SUMMARY OF THE INVENTION

It is therefore an object of this invention to construct a telephone coupler having solid-state timing and control circuitry for clearing and transferring a telephone line to automatic dialing apparatus.

The present invention is summarized in that a coupler for use with a telephone system includes contact means having first and second operative states, a switching network adapted to be connected with a telephone line for alternatively connecting the telephone line with a first circuit and a second circuit, a control network connected with the switching network and the contact means for placing the switching network in a position connecting the telephone line with the second circuit when the control means assumes its second operative state, and a release network connected with the control means and the contact means for releasing the switching means to a position connecting the telephone line with the first circuit a preselected delay interval subsequent to the contact means assuming its first operative state, the preselected delay interval being greater than a hang-up interval of the telephone system.

Another object of the present invention is to transfer a telephone line from house phones to automatic dialing apparatus with total house phone exclusion.

The present invention has a further object in the construction of an alarm coupler including a solid-state dial pulse reconstitution network to assure the transmission of proper dialing pulses through a public telephone system so as to increase accuracy and reduce telephone system interference.

The present invention is advantageous over prior art couplers in that solid-state devices are employed to perform control and timing functions, that a telephone line is transferred from house phones to automatic dialing apparatus immediately upon the occurrence of an alarm, that a subscriber's line is cleared for an alarm call regardless of the in-use status of the house phones, that reversion to the house phones is delayed to permit redialing by the alarm apparatus, that dial pulses are reshaped to public telephone system standards, and that the quiescent current drain of the coupler is negligible.

Further objects and advantages of the present invention will become apparent from the following description of a preferred embodiment when taken in conjunction with the accompanying drawings.

DESCRIPTION OF THE PREFERRED EMBODIMENT

The present invention is adapted to be used in connection with automatic or semiautomatic dialing apparatus of the type which is responsive to various alarm or emergency conditions, such as fire, excess temperature, burglary, etc., for initiating a dialing sequence to place a call through a local public telephone exchange to a central monitoring station. After such a call has been completed, a message may be transmitted to the central station apprising the operator of the location and nature of the emergency, and upon termination of the alarm sequence, the automatic dialing apparatus will hang-up and release the line. Apparatus of this general type is well known and will not be described in detail for the sake of brevity.

In order to prevent a malfunctioning dialer from interfering with the public telephone system and conventional house phones and to provide DC isolation between the automatic dialing apparatus and the subscriber's telephone line, the alarm coupler of the present invention is designed to automatically transfer the telephone line from conventional house phones to the automatic dialing apparatus upon the occurrence of an alarm and back to the house phones after the alarm sequence is terminated. The alarm coupler of the present invention also precludes the transmission of dialing pulses which are outside the standards established by the public telephone system and give priority to calls initiated by the automatic dialing apparatus by excluding the house phones during an alarm sequence.

Figure 1:
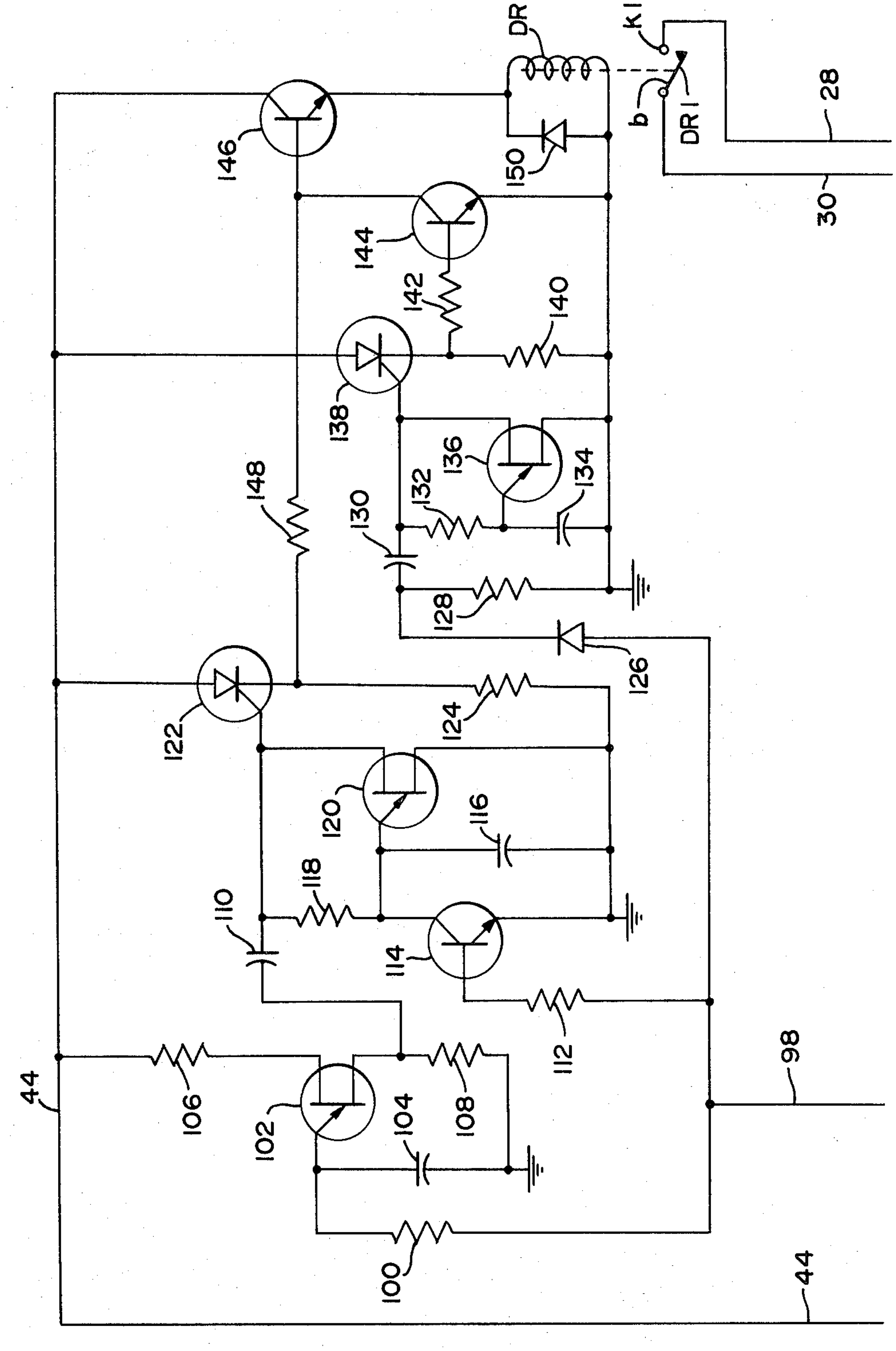
FIGS. 1 and 2 are schematic diagrams which, taken together, illustrate a preferred embodiment of an alarm coupler according to the present invention.
Figure 2:
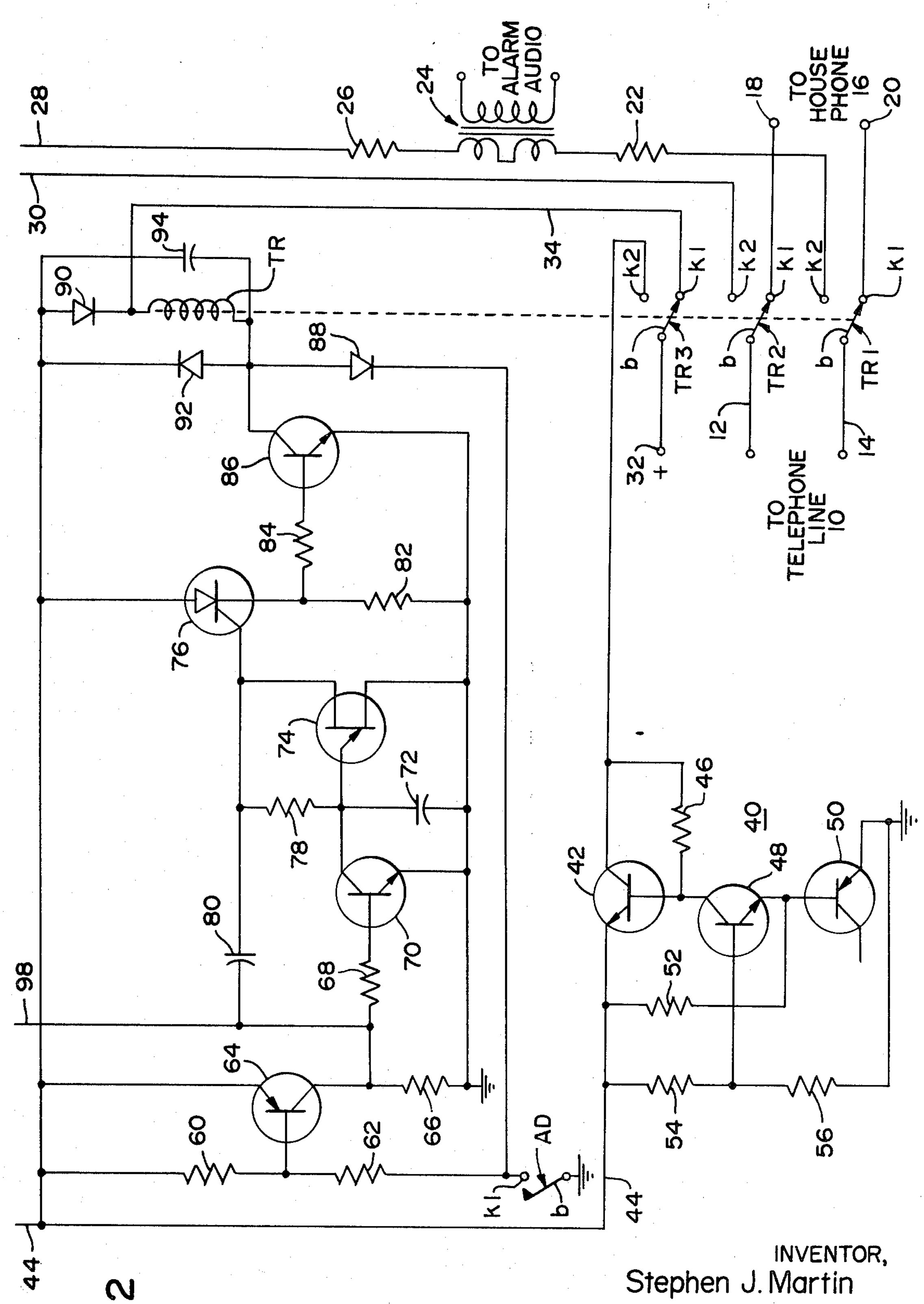

Referring to FIGS. 1 and 2 of the drawings, a preferred embodiment of the alarm coupler according to the present invention includes a transfer relay having a relay coil TR (FIG. 2) which controls the position of a ganged set of single-pole-double-throw switches TR1, TR2 and TR3. Blades *b* of switches TR1 and TR2 are connected to a leased telephone line 10 via lines 12 and 14, and fixed contacts *k*1 thereof are connected to a conventional house phone 16 at terminals 18 and 20. Fixed contact *k*2 of switch TR1 is connected to one end of a series network formed by a resistor 22, the split winding of an audio isolation transformer 24 and a resistor 26. The other end of the series network is connected through line 28 to a fixed contact *k*1 of a normally-open set of contacts DR1. Contacts DR1 are part of a dialing repeat relay which also includes a dialing relay coil DR for controlling contacts DR1. The blade *b* of switch DR1 is connected via line 30 to fixed contact *k*2 of switch TR2 to complete an alternate circuit connected with the telephone line 10 when transfer relay TR is actuated.

Switch TR3 has a blade *b* connected to a source of DC operating potential represented by terminal 32, a first fixed contact *k*1 connected through line 34 to one side of relay coil TR, and a second fixed contact *k*2 which is coupled to the input of a voltage regulator network 40. Voltage regulator 40 includes a series regulating transistor 42 having its collector electrode connected with contact *k*2 of switch TR3 and its emitter electrode connected to supply a main power bus 44. The base electrode of transistor 42 is connected to the collector thereof by a resistor 46 and is further connected to the collector electrode of an NPN control transistor 48. The emitter electrode of transistor 48 is connected to ground through the base-emitter junction of a PNP transistor 50 acting as a Zener diode. A resistor 52 is connected from power bus 44 to the junction of the emitter and base electrodes of transistors 48 and 50, respectively, and a voltage divider feedback network formed by resistors 54 and 56 is connected between power bus 44 and ground with the junction of resistors 54 and 56 tied to the base electrode of transistor 48.

An inverter circuit includes a pair of serially connected resistors 60 and 62 which are coupled from power bus 44 to a fixed contact *k*1 of an alarm pulsing contacts AD which has its blade *b* connected to ground. A PNP transistor 64 has its base electrode connected to the junction of resistors 60 and 62 and its emitter electrode tied to power bus 44. The output of the inverter is taken from the collector electrode of transistor 64 which is coupled to ground by a resistor 66.

The output from the collector electrode of transistor 64 coupled by a resistor 68 to the base electrode of an inhibiting transistor 70 which has its emitter electrode returned to ground. A storage capacitor 72 is coupled across the collector-emitter path of transistor 70, with the collector electrode thereof connected with the emitter electrode of a unijunction transistor 74. Unijunction transistor 74 has its base-one electrode tied directly to ground and its base-two electrode connected to the gate of a solid-state controlled switch, such as a silicon controlled rectifier (SCR) 76. The gate of SCR 76 is connected through a resistor 78 to the emitter electrode of unijunction transistor 74 and is also connected through a coupling capacitor 80 to the collector or output electrode of inverter transistor 64.

The anode electrode of SCR 76 is connected to power bus 44 and the cathode electrode thereof is connected to ground through a resistor 82. A resistor 84 couples the cathode of SCR 76 with the base electrode of an NPN transistor 86 which has its emitter returned directly to ground. The collector electrode of transistor 86 is connected to the bottom end of relay coil TR as is the anode of a diode 88 which has its cathode connected with contact *k*1 of switch AD. A voltage blocking diode 90 has its anode connected with power bus 44 and its cathode connected to the top end of relay coil TR to prevent the voltage appearing on line 34 from being fed to power bus 44 during quiescent or nonemergency conditions. A transient suppression network for coil TR is formed by a diode 92 and a capacitor 94 which are connected in parallel across the series connected coil TR and diode 90.

The output signal from the collector of inverter transistor 64 is fed via line 98 to a resistor 100 (FIG. 1) which is connected to the emitter electrode of a unijunction transistor 102. The emitter of transistor 102 is connected to ground through a storage capacitor 104, and the base-two electrode thereof is tied to power bus 44 by a resistor 106. Transistor 102 has its base-one electrode coupled to ground through a resistor 108 and is further connected to one side of a coupling capacitor 110. Line 98 from inverter transistor 64 is also connected through a resistor 112 to the base electrode of an inhibiting transistor 114. A storage capacitor 116 is connected in shunt with the collector-emitter path of transistor 114 and is further connected in series with a resistor 118 between the other side of capacitor 110 and ground. The junction of the capacitor 116 and the resistor 118 is connected to the emitter electrode of a unijunction transistor 120 which has its base-one electrode returned directly to ground and its base-two electrode connected to the junction of capacitor 110 and resistor 118 as well as to the gate of a controlled switch, such as an SCR 122. The anode of SCR 122 is connected with power bus 44 and its cathode is returned to ground through a resistor 124.

Line 98 is also connected to the anode of a diode 126 which has its cathode coupled to ground through a parallel network having a resistor 128 in one branch and a series connected coupling capacitor 130, resistor 132, and storage capacitor 134 in the other branch. The junction of resistor 132 and capacitor 134 is connected to the emitter electrode of a unijunction transistor 136 which has its base-one electrode grounded and its base-two electrode connected to the junction of capacitor 130 and resistor 132. The base-two electrode of transistor 136 is also connected to the gate of a controlled switch, such as an SCR 138. SCR 138 is connected to receive operating potential at its anode from power bus 44 and has its cathode connected through a resistor 140 to ground and through a resistor 142 to the base electrode of another NPN transistor 146 to form a pulse shaping network. A resistor 148 couples the cathode of SCR 122 with the base of transistor 146 which has its collector electrode coupled with power bus 44. The emitter of transistor 146 is connected through relay coil DR to ground, and a diode 150 is connected in shunt with relay coil DR for transient suppression.

The alarm coupler of the present invention is illustrated in FIGS. 1 and 2 in its quiescent state during which time the telephone line 10 is connected through switches TR1 and TR2 to a conventional house phone 16. In this condition, the house phones are directly connected to the public telephone system with the alarm apparatus having no effect on normal usage thereof. With the alarm coupler in its quiescent or relaxed state, switch TR3 supplies power from supply 32 through contact *k*1 and line 34 to the top end of transfer relay coil TR. Since no power is supplied through fixed contact *k*2 of switch TR3, bus 44 will be isolated from power supply 32 to preclude the various circuit components from drawing any current at this time.

Upon the occurrence of an alarm condition, alarm pulsing contacts AD will be closed by the automatic dialing apparatus (not shown) to initiate the alarm sequence of operation. When contacts AD close, the bottom end of relay coil TR is connected to ground through diode 88 to complete a current flow path from power supply 32 through blade *b* and fixed contact *k*1 of switch TR3, line 34, relay coil TR, diode 88 and contacts AD to ground. The relay coil TR will thus be energized so as to move blades *b* of switches TR1, TR2 and TR3 from fixed contacts *k*1 to fixed contacts *k*2 thereof. With switch TR3 in its actuated position, DC operation potential from power supply 32 will be fed through contact *k*2 to the voltage regulator 40. The series regulating transistor 42 of voltage regulator 40 will thereafter supply a positive potential to power bus 44 with a feedback signal being supplied therefrom by voltage divider 54–56 to the base electrode of transistor 48. Transistor 48 accordingly controls the operative condition of the regulating transistor 42 such that the voltage on bus 44 will be kept nearly constant.

The operating potential on power bus 44 is fed to resistors 60 and 62 and inverter transistor 64 which is placed in a conductive state by the grounding of resistor 62 through the closed contacts AD. With transistor 64 in a conductive state, potential from power bus 44 is supplied through the emitter-collector path of the transistor such that the voltage appearing on the collector electrode thereof becomes positive. The positive potential at the collector of transistor 64 is coupled via a pulse forming capacitor 80 to the gate electrode of SCR 76 to trigger the same into conduction. Potential from power bus 44 is thereafter fed through the anode-cathode junction of SCR 76 and resistor 84 to the base of transistor 86 which is then biased on. With transistor 86 in its conductive condition, the bottom end of relay coil TR is maintained grounded such that momentary opening of contacts AD will not result in the de-energization of the transfer relay. In essence, it can be seen that SCR 76 and transistor 86 cooperate to provide an alternate ground line path for coil TR so as to hold the relay energized after initial actuation thereof in response to the development of an emergency condition.

The positive potential appearing on the collector electrode of transistor 64 is also supplied through resistor 68 to transistor 70 which is thus placed in a conductive state. Transistor 70 has its collector-emitter path coupled in shunt with capacitor 72 and, when conductive, acts to preclude the charging of capacitor 72 from the potential supplied through the anode-gate path of SCR 76 and resistor 78. Storage capacitor 72, unijunction transistor 74, and resistor 78 act as a timing network for the extinguishment of SCR 76 after a time delay interval greater than that which is required to hang-up or release the telephone line 10. For purposes of example, it will be assumed that the normal hang-up time of the public telephone system is 1.5 seconds and that the delay interval required to build up a sufficient charge across capacitor 72 to fire the unijunction transistor 74 is 5 seconds. Thus, 5 seconds after contacts AD become open, and transistor 70 becomes non-conducting, capacitor 72 will become charged and unijunction transistor 74 will fire. After unijunction transistor 74 has fired, sufficient current is drawn through its base-two to base-one path to cause SCR 76 to revert to its non-conductive state thereby removing potential from the base of transistor 86. Consequently, transistor 86 turns off and releases relay coil TR to place the circuit into its quiescent or standby state.

Thus, prior to the occurrence of an alarm, operating potential will be supplied via line 34 to the top end of coil TR to prime the same for energization. It is noted that diode 90 prevents the flow of current from line 34 to power bus 44 such that the alarm coupler according to the present invention will draw little, if any, power during its standby or quiescent periods. After contacts AD have closed, transistor 64 supplies a pulse through capacitor 80 for triggering SCR 76. With SCR 76 on, transistor 86 is rendered conductive to hold relay coil TR energized. At this same time, transistor 70 is turned on to prevent capacitor 72 from charging and causing SCR 76 to be extinguished. With relay coil TR energized, switches TR1 and TR2 thereof will be moved such that the blades *b* thereof engage fixed contacts *k*2 so as to remove the house phone 16 from telephone line 10 and connect the telephone line with the alarm coupler dialing circuit formed by series network 22–24–26, line 28, normally-open contacts DR1 and line 30. Contacts DR1 remain open until the dialing relay coil DR is energized as described below. Positive potential provided by inverter transistor 64 when contacts AD are closed is supplied by line 98 and resistor 100 to storage capacitor 104 and the emitter electrode of transistor 102. Since capacitor 104 is initially discharged, the potential on the emitter of unijunction transistor 102 will initially be zero and will gradually build up as capacitor 104 becomes charged by the potential on line 98. After a delay interval sufficient to hang-up the telephone line has elapsed, which delay interval may be 1.5 seconds, for example, the unijunction transistor 102 will fire to feed operating potential from power bus 44 through resistor 106 and transistor 102 to a pulse forming capacitor 110. The pulse developed by capacitor 110 is supplied to the gate of SCR 122 so as to trigger the same into conduction. The SCR 122 will then supply power from supply bus 44 through resistor 148 to the base of transistor 146 placing it in a conductive state for energization of dialing relay coil DR. The dialing relay coil will thereafter cause the closure of relay contacts DR1 so as to complete the alarm coupler dialing circuit for seizing the telephone line 10. Thus, since unijunction transistor 102 is fired only after a delay interval of 1.5 seconds, for example, after the alarm pulsing contacts AD have closed, the dialing relay contacts DR1 will not be closed for the 1.5 second interval whereby the telephone line will be hung-up or cleared for the subsequent placing of the alarm call.

Once the telephone line has been seized and a dial tone has been received, the alarm pulsing contacts AD will be momentarily opened or pulsed by the automatic dialing apparatus (not shown) in accordance with a prerecorded telephone number of the central monitoring station of the alarm system. Each time the alarm pulsing contacts AD are momentarily opened, the potential at the collector of inverter transistor 64 will momentarily drop to zero whereupon a series of negative-going pulses will be developed on line 98. These pulses are coupled through diode 126 to a dial pulse reconstitution network and cause the generation of uniform dialing pulses for operating dialing relay DR.

The dialing pulse reconstitution network is in the nature of a one-shot or monostable circuit which produces an output pulse of uniform duration in response to the receipt of the negative going dialing pulses on line 98 regardless of the pulse width of such input signals. More specifically, on the positive going or trailing edge of each of the negative dialing pulses fed through diode 126, a pulse will be developed through capacitor 130 for triggering SCR 138 into conduction. When SCR 138 fires, positive potential is fed from power bus 44 to the base of transistor 144 so as to bias transistor 144 into conduction. With transistor 144 on, the potential at the base of transistor 146 is reduced sufficiently to turn off transistor 146 thereby interrupting the current supply path for relay coil DR and releasing contacts DR1 to their normally-open position. When SCR 138 is triggered, a positive potential appears at the gate electrode thereof causing a charge to be built up across storage capacitor 134. After a short interval conforming to the dialing pulse width standards set by the public telephone system, which may be 60 milliseconds for example, the voltage across capacitor 134 will cause unijunction transistor 136 to fire so as to tie the gate electrode of SCR 138 to ground and extinguish the same. When SCR 138 is extinguished, biasing potential is removed from transistor 144 turning the transistor off and enabling the bias voltage from SCR 122 to again render transistor 146 conductive so as to energize relay coil DR. Thus, regardless of the duration or pulse width of the input pulses fed to capacitor 130, the SCR 138 will be conductive for the desired 60 millisecond interval such that dialing relay contacts DR1 will be open for a uniform period in accordance with desired public telephone system standards.

A release or call-cancel network is also provided by the alarm coupler according to the present invention so as to hang-up the telephone line in the event of open circuit malfunction of contacts AD or under conditions where the pulse width or pulse train separation of dialing signals on line 98 exceed a predetermined upper limit which would otherwise cause malfunction of central telephone exchange equipment of the public telephone system.

The release network includes a unijunction transistor 120 which is fired in response to the build up of a charge across storage capacitor 116 after a delay interval of 0.5 seconds, for example. At the expiration of the 0.5 second interval, the unijunction transistor 120 will fire, extinguishing SCR 122 and turning off transistor 146. With transistor 146 off, relay coil DR is de-energized releasing dialing relay contacts DR1 and hanging-up the telephone line. Control of the charging of capacitor 116 is provided by transistor 114 which inhibits or shunts the capacitor 116 whenever the transistor 114 is rendered conductive by a positive potential on line 98. In other words, unijunction transistor 120 will be fired and SCR 122 will be extinguished 0.5 seconds after the potential on line 98 drops to zero in response to the opening of dialing contacts AD. Thus, in the event alarm pulsing contacts AD should malfunction or otherwise remain open for a period greater than 0.5 seconds, SCR 122 will be extinguished and telephone line 10 will be released.

To briefly reiterate the operation of the alarm coupler of the present invention, during quiescent periods the telephone line 10 will be connected through switches TR1 and TR2 with the conventional house phone 16 enabling normal use thereof by a subscriber. At this time, operating potential from source 32 is supplied through switch TR3 and line 34 to the transfer relay coil TR. Coil TR remains de-energized as a result of the open ground return path presented by open contacts AD. The alarm coupler remains in this condition with no quiescent current drain until an emergency condition develops.

In the event of an alarm, dialing contacts AD will be closed to complete the ground return path for relay coil TR causing switches TR1, TR2 and TR3 to move to their actuated positions. Relay coil TR is maintained on thereafter since closure of contacts AD causes transistor 64 and capacitor 80 to trigger SCR 76 which in turn biases transistor 86 on to provide an alternate ground return path for coil TR.

With relay TR energized, the telephone line is taken from the house phone 16 and transferred by switches TR1 and TR2 to the alarm coupler dialing contacts DR1. Contacts DR1 will remain open, however, for an interval of 1.5 seconds, for example, since energization of relay coil DR will occur only after capacitor 104 has built up a sufficient charge to fire unijunction transistor 102 so as to trigger SCR 122. After the 1.5 second delay, the potential on power bus 44 will be supplied through the SCR and resistor 148 for biasing transistor 146 into conduction such that operating voltage is supplied to coil DR.

It can be seen that upon the occurrence of an alarm the alarm coupler of the present invention will immediately transfer the telephone line from the house phones to the alarm coupler dialing circuit but will present an open circuit to the telephone line for a 1.5 second interval sufficient to assure hang-up or line clearance of the telephone circuits for the subsequent receipt of an alarm call. As a result, the circuit of the present invention not only totally excludes the house phones from the telephone system during an emergency, but in addition, assures proper telephone line clearance, regardless of the in-use status of the house phones, by hanging-up the telephone line for the 1.5 second interval.

The above described operation overcomes a serious disadvantage of the prior art. While conventional couplers completely remove the house phones from the telephone circuit, they often fail to clear the line for the subsequent emergency call with obvious detrimental results. For example, where the telephone line is transferred from the house phone to a closed or actuated circuit, if a house phone is off the hook at this time and if no number has been dialed, the switching action will result in the generation of a pulse equivalent to dialing the digit one. Subsequent action of the automatic dialing apparatus will obviously result in either an incomplete or improper connection such that the alarm message is never received at the central monitoring station. Likewise, if the house phone is in use upon the occurrence of the alarm, the telephone line will merely be transferred to the alarm apparatus and subsequently generated dialing pulses will have no effect.

It can be appreciated that by delaying the closure of dialing relay contacts DR1 for a 1.5 second hang-up interval after the initial actuation of the main transfer relay TR, the telephone line is effectively cleared independently of the status of the house phones to assure prompt and accurate completion of all alarm calls.

As described above, once the alarm coupler has been actuated and the 1.5 second delay interval has elapsed, dialing relay contacts DR1 will be closed to seize the telephone line for the placing of a call to the central monitoring station. Thereafter, pulses produced by the momentarily opening of contacts AD will be fed by line 98 to the pulse reconstitution network formed by unijunction transistor 136, SCR 138 and transistor 134 which acts to reconstruct the dialing pulses to meet with public telephone system standards. In other words, each pulse fed over line 98 to the pulse reconstitution network will cause SCR 138 to fire which in turn causes transistor 134 to conduct so as to place transistor 146 in its non-conducting state for releasing contacts DR1. The firing of SCR 138 causes capacitor 134 to begin to charge and after a constant interval of 60 milliseconds, for example, the unijunction transistor 136 will fire to extinguish SCR 138 causing transistor 134 to become non-conductive, permitting transistor 146 to turn on and supply operating potential once again to coil DR.

During the dialing sequence described above, transistor 114 is alternately rendered conductive and non-conductive with the transistor being off each time the dialing contacts AD become open. Since SCR 122 is conductive during the alarm sequence, operating potential will appear at the gate electrode thereof such that a charge will be developed across capacitor 116 whenever transistor 114 is open. Should the alarm pulsing contacts AD remain open for an interval greater than 0.5 seconds, for example, the charge across capacitor 116 will fire unijunction transistor 120 and extinguish SCR 122. As a result, transistor 146 would turn off and contacts DR1 would drop out to their normally-open position so as to release the telephone line and disconnect the call. In this manner, an open circuit failure of contacts AD will, after 0.5 seconds, automatically result in the alarm coupler hanging-up the telephone line and releasing the same for alternate use. Furthermore, undue pauses between pulses or pulse trains in the dialing pulse sequence will likewise result in the release of the telephone line by the action of unijunction transistor 120 such that the public telephone system will be protected against the receipt of excessively delayed pulses or improperly separated pulses which might otherwise adversely affect the operation of the telephone exchange equipment.

At the end of the alarm sequence, alarm pulsing contacts AD will revert to their normally-open position as shown in FIG. 2 causing transistors 64 and 70 to be turned off whereupon capacitor 72 will begin to charge. After a release interval of 5 seconds, for example, has elapsed, unijunction transistor 74 will be fired to extinguish SCR 76, turning off transistor 86 to de-energize relay coil TR. Switches TR1, TR2 and TR3 will then revert to their illustrated relaxed positions reconnecting the house phone 16 to the telephone line and placing the alarm coupler in its quiescent state for the receipt of a subsequent alarm. By providing a release delay greater than the required hang-up interval of the telephone system before transferring the telephone line back to the house phone 16, the dialing sequence may be re-initiated to place a second call without ever reconnecting the telephone line to the conventional house phones. In this manner, the automatic dialing apparatus may place a second call in the event that the first call was not completed without having first to transfer over to the house phones and then switch back to the alarm coupler dialing circuit.

It can thus be seen that the present invention provides numerous advantages in both construction and operation in that solid state devices are employed to perform control and timing functions, that a telephone line is transferred from house phones to alternate dialing apparatus immediately upon the occurrence of an alarm, that a subscriber line is cleared for an alarm call regardless of the in-use status of the house phones, that reversion to the house phones is delayed to permit redialing by the alarm apparatus, that dialed pulses are reshaped to public telephone system standards, and that quiescent current drain is negligible.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. An alarm coupler for selectively interfacing automatic dialing alarm means and a conventional house telephone with a telephone line, comprising:

a set of alarm pulsing contacts adapted to be actuated by said alarm means to generate pulses;

dialing means responsively connected with said set of alarm pulsing contacts and adapted to seize a telephone line and transmit over said line uniform dialing pulse signals reconstituted from said alarm pulse contact pulses;

transfer switching means responsively connected with said alarm pulsing contacts and adapted to be connected with said telephone line and a conventional house phone, said transfer switching means having a first state providing a connection between the telephone line and the house phone and a second state providing a connection between the telephone line and said dialing means; and release timing means connected between said set of alarm pulsing contacts and said transfer switching means for actuating and thereafter maintaining said transfer switching means in said second state upon closure of said alarm pulsing contacts and for releasing said transfer switching means to said first state in response to the opening of said set of alarm pulsing contacts for a predetermined interval greater than that required to release the telephone line.

2. The invention as recited in claim 1 wherein said dialing means includes hang-up delay means for presenting an open circuit to the telephone line for a delay interval sufficient to release the telephone line upon actuation of said alarm pulsing contacts, said release delay interval being less than said predetermined interval.

3. The invention as recited in claim 2 wherein said hang-up delay means includes controlled-switch means having first and second operative states and delay timing means connected to actuate said controlled-switch means to said second operative state after said hang-up delay interval has elapsed.

4. The invention as recited in claim 3 wherein said controlled switch means includes a silicon controlled rectifier, and wherein said delay timing means includes a unijunction transistor having one base connected to gate electrode of said silicon controlled rectifier and a storage capacitor connected to the emitter electrode of said transistor.

5. The invention as recited in claim 3 further including circuit means connected to said controlled-switch means and said alarm pulsing contacts and adapted to place said controlled-switch means in said first operative state whenever said alarm pulsing contacts are maintained open for at least a preselected interval greater than the period of a dialing pulse.

6. The invention as recited in claim 5 wherein said circuit means includes a unijunction transistor having one base connected to the gate electrode of said controlled-switch means and a storage capacitor connected to the emitter electrode of said unijunction transistor.

7. The invention as recited in claim 6 wherein said circuit means further includes an inhibiting transistor connected across said storage capacitor and responsive to closure of said alarm pulsing contacts to inhibit the charging of said storage capacitor.

8. The invention as recited in claim 1 wherein said release timing means includes switch means connected to said transfer switching means and having first and second operative conditions, said transfer switching means assuming said first state in response to said switch means assuming said first condition and said transfer switching means assuming said second state in response to said switch means assuming said second condition, and said release timing means further includes coupling means connected to said alarm pulsing contacts and said switch means and adapted to place said switch means in said second condition in response to closure of said alarm pulsing contacts.

9. The invention as recited in claim 8 wherein said switch means comprises a silicon controlled rectifier.

10. The invention as recited in claim 8 wherein said release timing means further includes circuit means connected to said switch means and adapted to place said switch means in said first condition after a predetermined delay interval from opening of said alarm pulsing contacts.

11. The invention as recited in claim 10 wherein said release timing means further includes means connected to said circuit means and said alarm pulsing contacts for inhibiting the operation of said circuit means whenever said alarm pulsing contacts are closed.

12. The invention as recited in claim 11 wherein said circuit means includes a unijunction transistor having one base connected to the gate electrode of said silicon controlled rectifier and a capacitor connected to the emitter electrode of said unijunction transistor, and wherein said inhibit means comprises a transistor connected in shunt with said capacitor.

13. The invention as recited in claim 1 wherein said dialing means includes pulse reconstitution means responsive to momentary opening of said alarm pulsing contacts for transmitting dialing pulses having uniform pulse width.

14. The invention as recited in claim 13 wherein said pulse reconstitution means includes monostable means responsive to momentary opening of said alarm pulsing contacts to assume an unstable state for a preselected interval independent of the duration of the opening of said alarm pulsing contacts.

15. The invention as recited in claim 14 wherein said monostable means includes controlled-switch means assuming a triggered state in response to momentary opening of said alarm pulsing contacts and extinguishing means connected to said controlled-switch means for extinguishing the same after said preselected interval has elapsed.

16. The invention as recited in claim 15 wherein said controlled-switch means includes a silicon controlled rectifier, and wherein said extinguishing means includes a unijunction transistor having one base connected to the gate electrode of said silicon controlled rectifier and a storage capacitor connected to the emitter electrode of said unijunction transistor.

* * * * *